United States Patent
Makigaki

(10) Patent No.: US 8,947,548 B2
(45) Date of Patent: Feb. 3, 2015

(54) CAMERA BODY AND INTERCHANGEABLE LENS

(75) Inventor: Taro Makigaki, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/806,259

(22) PCT Filed: Jun. 29, 2011

(86) PCT No.: PCT/JP2011/064958
§ 371 (c)(1),
(2), (4) Date: Mar. 13, 2013

(87) PCT Pub. No.: WO2012/005157
PCT Pub. Date: Jan. 12, 2012

(65) Prior Publication Data
US 2013/0176480 A1  Jul. 11, 2013

(30) Foreign Application Priority Data
Jul. 6, 2010  (JP) .................................. 2010-154085

(51) Int. Cl.
*H04N 5/232*  (2006.01)
*H04N 5/228*  (2006.01)
(Continued)

(52) U.S. Cl.
CPC .............. *H04N 5/2254* (2013.01); *G03B 17/14* (2013.01); *H04N 5/23209* (2013.01)
USPC ................ 348/211.14; 348/222.1; 348/223.1; 348/231.3; 348/231.6; 348/241; 348/335

(58) Field of Classification Search
USPC ............................ 348/207.1–207.11, 211.14, 348/222.1–225.1, 231.99–231.9, 335–344, 348/373–376
See application file for complete search history.

(56) References Cited

U.S. PATENT DOCUMENTS 4,860,113 A * 8/1989 Miyamoto et al. ............ 348/187
5,255,043 A * 10/1993 Kawasaki ...................... 396/78
(Continued)

FOREIGN PATENT DOCUMENTS

JP   A-2-65477    3/1990
JP   A-11-288029  10/1999
(Continued)

OTHER PUBLICATIONS

International Search Report issued in International Patent Application No. PCT/JP2011/064958 dated Jul. 26, 2011.

*Primary Examiner* — Michael Osinski
(74) *Attorney, Agent, or Firm* — Oliff PLC

(57) ABSTRACT

A camera body at which an interchangeable lens, holding a plurality of sets of optical characteristics data, each expressing specific optical characteristics in one of a plurality of representation formats, can be detachably mounted, includes: an identification information reception unit that receives lens-side identification information from the interchangeable lens, which indicates the plurality of representation formats; an identification information storage unit in which body-side identification information indicating each representation format that the camera body is capable of recognizing among the plurality of representation formats, is stored; a selection unit that selects a single representation format included in both the lens-side and the body-side identification information, among the plurality of representation formats; a request unit that issues a request to the interchangeable lens for the optical characteristics data corresponding to the selected representation format; and an optical characteristics reception unit that receives the requested optical characteristics data from the interchangeable lens.

6 Claims, 7 Drawing Sheets

Figure 1:
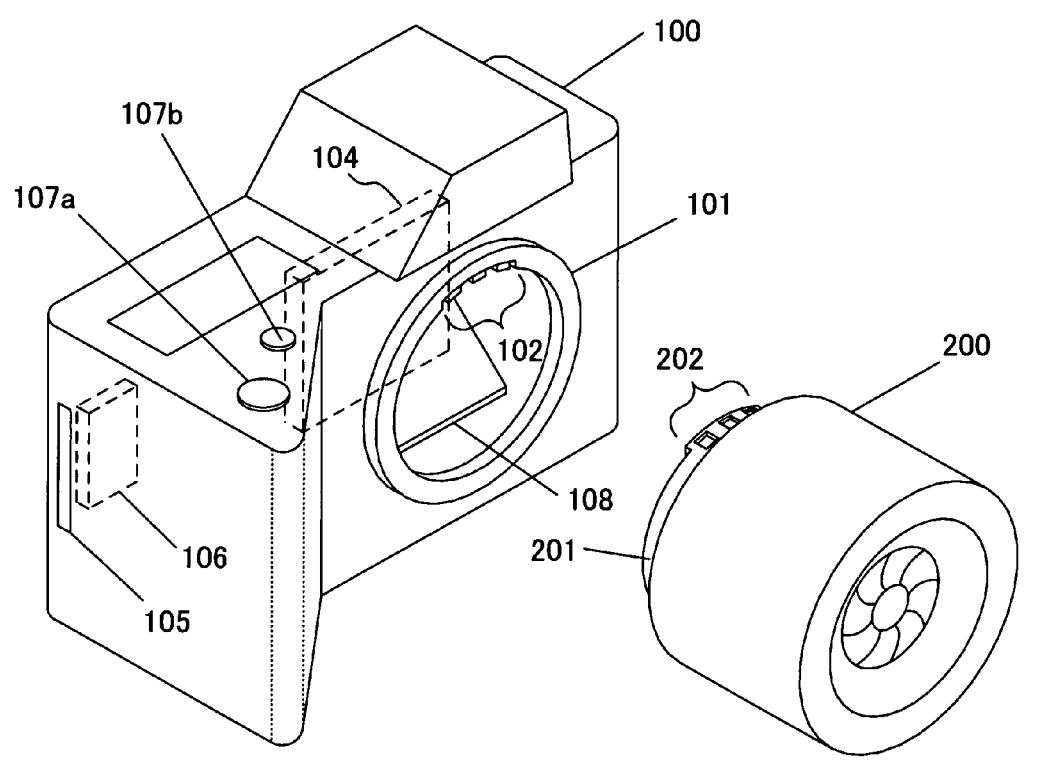

(51) Int. Cl.
*H04N 9/73* (2006.01)
*H04N 5/76* (2006.01)
*H04N 5/217* (2011.01)
*H04N 5/225* (2006.01)
*G02B 13/16* (2006.01)
*G03B 17/14* (2006.01)

(56) References Cited

U.S. PATENT DOCUMENTS

| | | | | |
|---|---|---|---|---|
| 5,839,002 | A * | 11/1998 | Miyake et al. | 396/91 |
| 6,504,958 | B1 * | 1/2003 | Suzuki | 382/255 |
| 6,845,218 | B2 * | 1/2005 | Miyasaka et al. | 396/301 |
| 7,467,900 | B2 * | 12/2008 | Higuma | 396/529 |
| 7,583,893 | B2 * | 9/2009 | Horii et al. | 396/532 |
| 7,619,661 | B2 * | 11/2009 | Takahashi et al. | 348/224.1 |
| 7,677,818 | B2 * | 3/2010 | Akiyama et al. | 396/529 |
| 7,883,281 | B2 * | 2/2011 | Higuma | 396/529 |
| 7,955,010 | B2 * | 6/2011 | Tamura | 396/529 |
| 8,248,509 | B2 * | 8/2012 | Shirai | 348/335 |
| 8,408,824 | B2 * | 4/2013 | Tamura | 396/529 |
| 8,542,989 | B2 * | 9/2013 | Shibuno et al. | 396/133 |
| 8,654,244 | B2 * | 2/2014 | Okamura | 348/360 |
| 2002/0047912 | A1 * | 4/2002 | Mabuchi et al. | 348/345 |
| 2003/0142970 | A1 * | 7/2003 | Nishida et al. | 396/155 |
| 2004/0052515 | A1 * | 3/2004 | Nishida et al. | 396/155 |
| 2004/0057712 | A1 * | 3/2004 | Sato et al. | 396/89 |
| 2005/0013605 | A1 * | 1/2005 | Kubo | 396/374 |
| 2006/0159447 | A1 * | 7/2006 | Watanabe | 396/529 |
| 2006/0171707 | A1 * | 8/2006 | Higuma | 396/529 |
| 2006/0262199 | A1 * | 11/2006 | Takahashi et al. | 348/231.2 |
| 2007/0104474 | A1 * | 5/2007 | Tamura | 396/91 |
| 2007/0147815 | A1 * | 6/2007 | Tanaka | 396/56 |
| 2008/0111899 | A1 * | 5/2008 | Numako et al. | 348/240.1 |
| 2008/0199174 | A1 * | 8/2008 | Yoshida | 396/257 |
| 2008/0226280 | A1 * | 9/2008 | Numako et al. | 396/310 |
| 2009/0167925 | A1 * | 7/2009 | Murata | 348/345 |
| 2010/0209097 | A1 * | 8/2010 | Sasaki et al. | 396/529 |
| 2011/0037881 | A1 * | 2/2011 | Natsume | 348/241 |
| 2011/0110656 | A1 * | 5/2011 | Hamada | 396/133 |
| 2011/0145804 | A1 * | 6/2011 | Oka | 717/168 |
| 2011/0292351 | A1 * | 12/2011 | Ishii | 353/69 |
| 2012/0236128 | A1 * | 9/2012 | Ueda et al. | 348/49 |

FOREIGN PATENT DOCUMENTS

| | | |
|---|---|---|
| JP | A-2002-354490 | 12/2002 |
| JP | A-2004-109673 | 4/2004 |
| JP | A-2008-96907 | 4/2008 |

* cited by examiner

| WAVELENGTH(nm) | 380 | 390 | 400 | 410 | ... | 780 |
|---|---|---|---|---|---|---|
| SPECTRAL TRANSMITTANCE(%) | 70.00 | 74.29 | 78.00 | 81.16 | ... | 73.06 |

(a)

(b)

(c)

| WAVELENGTH(nm) | 380 | 385 | 390 | 395 | ... | 780 |
|---|---|---|---|---|---|---|
| SPECTRAL TRANSMITTANCE(%) | 70.00 | 72.22 | 74.29 | 76.22 | ... | 73.06 |

(a)

(b)

(c)

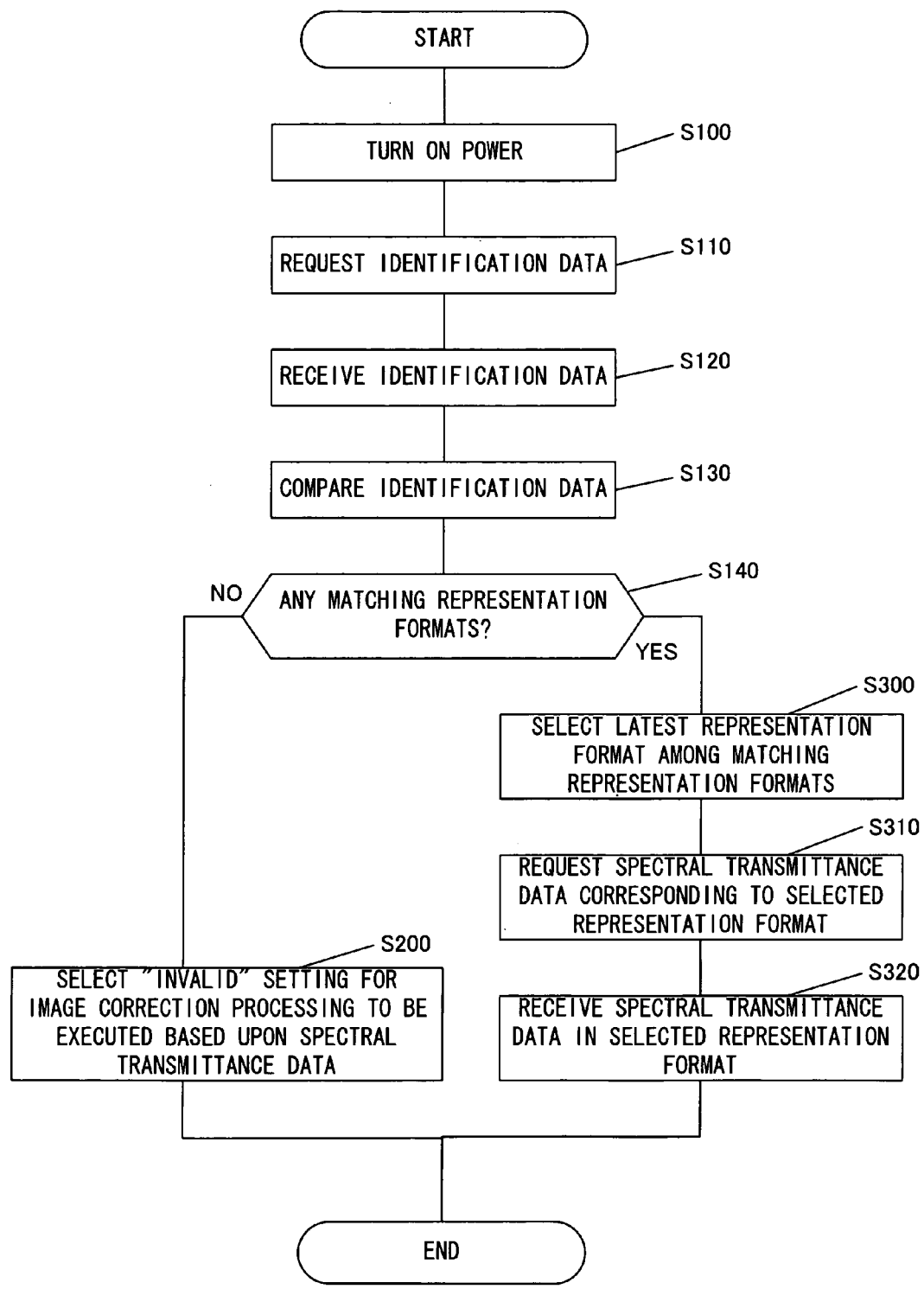

CAMERA BODY AND INTERCHANGEABLE LENS

TECHNICAL FIELD

The present invention relates to a camera body and an interchangeable lens.

BACKGROUND ART

There are camera systems compatible with interchangeable lenses in the known art that allow optical characteristics information pertaining to the optical characteristics of a photographic optical system to be stored within each interchangeable lens and enable optical correction to be executed on the camera body-side by using the optical characteristics information. Patent literature 1, for instance, discloses a lens device that holds correction information regarding lateral chromatic aberration and correction information regarding limb darkening stored therein. This lens device transmits the various types of correction information to an image capturing apparatus as it becomes connected to the image capturing apparatus or as power to the image capturing apparatus is turned on. The image capturing apparatus then corrects aberration attributable to the lens by using the correction information it has received.

CITATION LIST

Patent Literature

Patent literature 1: Japanese Laid Open Patent Publication No. 2008-96907

SUMMARY OF INVENTION

Technical Problem

Even as advancing technologies make it possible to provide greater volumes of optical characteristics information or provide optical characteristics information in an improved data representation format, the issue of compatibility of an interchangeable lens and a camera body, either of which may be an older model, may present difficulty in changing the data representation format of the optical characteristics information.

According to the 1st aspect of the present invention, a camera body at which an interchangeable lens holding a plurality of sets of optical characteristics data can be detachably mounted, each of the plurality of sets of optical characteristics data expressing specific optical characteristics in one of a plurality of representation formats, comprises: that originates from the interchangeable lens, the lens-side identification information indicating the plurality of representation formats; an identification information storage unit in which body-side identification information is stored, the body-side identification information indicating each representation format that the camera body is capable of recognizing among the plurality of representation formats; a selection unit that selects a single representation format that is included in both the lens-side identification information and the body-side identification information, among the plurality of representation formats; a request unit that issues a request to the interchangeable lens for the optical characteristics data corresponding to the selected representation format; and an optical characteristics reception unit that receives the requested optical characteristics data from the interchangeable lens.

According to the 2nd aspect of the present invention, a camera body according to the 1st aspect may further comprise: an image processing unit that executes specific image processing based upon the optical characteristics data received by the optical characteristics reception means.

According to the 3rd aspect of the present invention, it is preferred that in a camera body according to the 1st or 2nd aspect, the plurality of representation formats are assigned with specific rankings; and if there is a plurality of representation formats included in both the lens-side identification information and the body-side identification information, the selection unit selects the single representation format based upon the specific rankings.

According to the 4th aspect of the present invention, it is preferred that in a camera body according to the 3rd aspect, the specific rankings are determined based upon a chronological order in which the plurality of representation formats became available.

According to the 5th aspect of the present invention, it is preferred that in a camera body according to any one of the 1st through 4th aspects, the identification information reception unit receives the lens-side identification information at least either as the interchangeable lens is mounted or as power to the camera body is turned on; and the optical characteristics reception unit repeatedly receives the requested optical characteristics data.

According to the 6th aspect of the present invention, it is preferred that an interchangeable lens that can be detachably mounted at a camera body according to any one of the 1st through 5th aspects, comprises: an identification information transmission unit that transmits the lens-side identification information to the camera body; an optical characteristics storage unit in which the plurality of sets of optical characteristics data are stored; and an optical characteristics transmission unit that transmits the optical characteristics data requested by the camera body, among the plurality of sets of optical characteristics data, to the camera body.

Advantageous Effect of the Invention

According to the present invention, the representation format for the optical characteristics information can be altered with ease while maintaining compatibility.

BRIEF DESCRIPTION OF THE DRAWINGS (FIG. 1) A perspective of a single lens reflex type camera 1 adopting the present invention (FIG. 2) A sectional view of the single lens reflex type camera 1 adopting the present invention (FIG. 3) A graph indicating the spectral transmittance characteristics of the photographic optical system 210

(FIG. 4) Examples of combinations of various representation formats (FIG. 5) Diagrams indicating first generation and second generation representation formats that may be adopted for spectral transmittance characteristics data (FIG. 6) Diagrams indicating third generation and fourth generation representation formats that may be adopted for spectral transmittance characteristics data (FIG. 7) A flowchart of the processing executed by the body-side control circuit 103

DESCRIPTION OF EMBODIMENTS

First Embodiment

FIG. 1 is a perspective of a single lens reflex type camera 1 adopting the present invention. It is to be noted that FIG. 1 specifically illustrates the devices and units relevant to the present invention and that no illustration or explanation of devices and units not directly relevant to the present invention is provided. The camera 1 comprises a camera body 100 and an interchangeable lens 200 that can be detachably mounted at the camera body 100.

A lens mount 101 at which the interchangeable lens 200 can be mounted is located at the camera body 100. In addition, a lens mount 201 that corresponds to the body-side lens mount 101 is located at the interchangeable lens 200. As the interchangeable lens 200 is engaged with the camera body 100, a connector portion 102 disposed on the lens mount 101 at the camera body 100 becomes connected with a connector portion 202 disposed on the lens mount 201 at the interchangeable lens 200. Via the connector portions 102 and 202, power is supplied from the camera body 100 to the interchangeable lens 200 and various signals are exchanged between the camera body 100 and the interchangeable lens 200.

An image sensor 104 is disposed further rearward relative to the lens mount 101 within the camera body 100. A quick return mirror 108, via which subject light is guided to a viewfinder at the camera body 100, is disposed between the lens mount 101 and the image sensor 104. As a recording medium 106 is inserted at a recording medium loading dock 105 located at a side surface of the camera body 100, the recording medium 106 becomes loaded in the camera body 100. Buttons 17a and 17b, each used as an input device, are disposed on the top side of the camera body 100.

Figure 2:
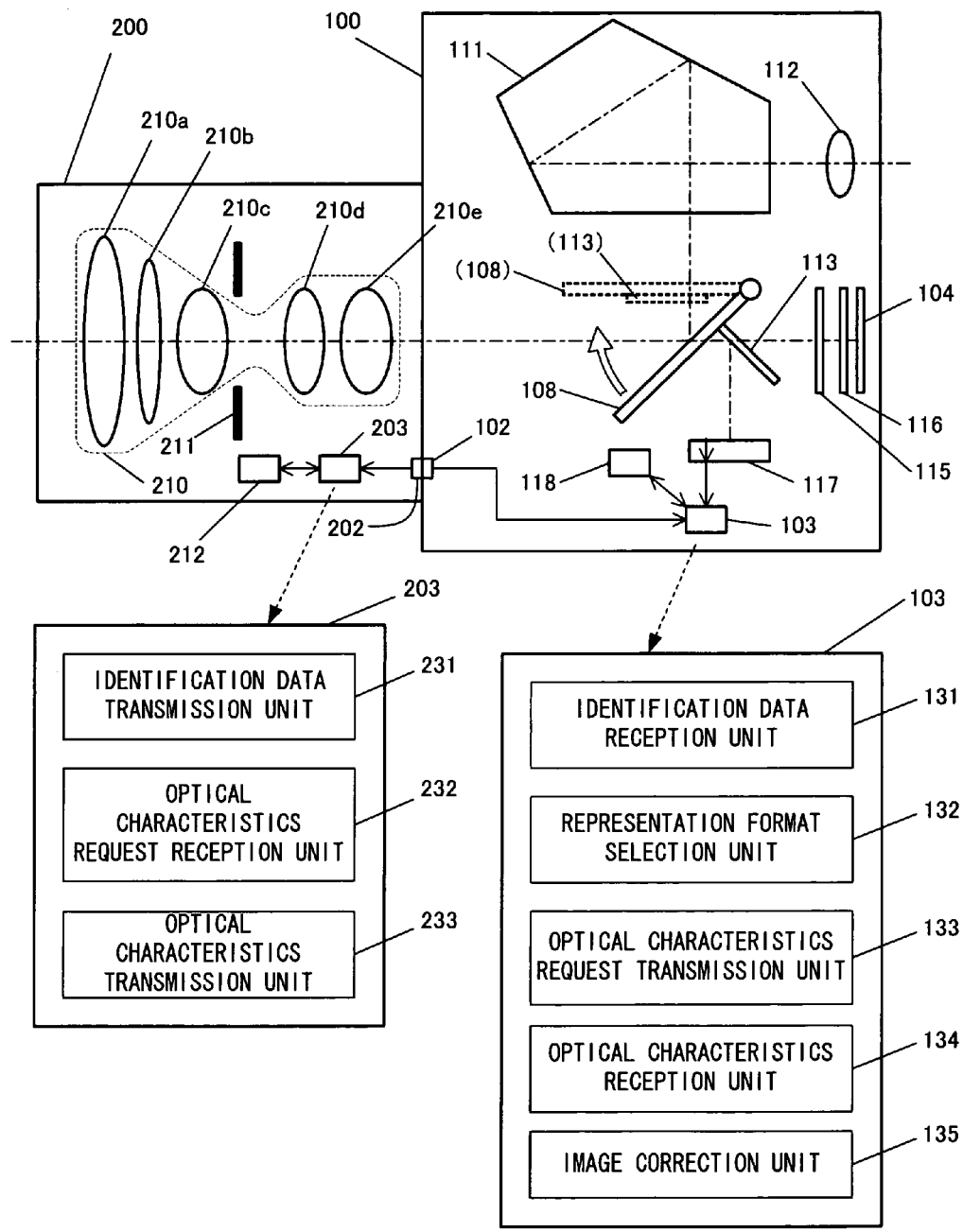

FIG. 2 is a sectional view of the single lens reflex type camera 1 adopting the present invention. The interchangeable lens 200 includes a photographic optical system 210 configured with lenses 210a through 210e. The lenses 210a through 210e include a lens (focusing lens) used to control the focusing position for the subject image and a lens used to adjust the focal length of the photographic optical system 210. An aperture 211 used to control the quantity of light to enter the photographic optical system 210 is disposed at the interchangeable lens 200.

A lens-side control circuit 203 that controls various units in the interchangeable lens 200 is disposed inside the interchangeable lens 200. The lens-side control circuit 203 is made up with a microcomputer, a RAM, their peripheral circuits and the like (none shown). The lens-side control circuit 203, which is connected to a lens ROM 212 and the connector portion 202, is able to exchange electrical signals with these units.

The lens-side control circuit 203 includes an identification data transmission unit 231, an optical characteristics request reception unit 232 and an optical characteristics transmission unit 233. These units are functional units, the functions of which are realized through software as the lens-side control circuit 203 executes a specific control program. The identification data transmission unit 231 transmits identification data, which will be described in detail later, to the camera body 100 via the connector portions 202 and 102. The optical characteristics request reception unit 232 receives an optical characteristics request signal originating from the camera body 100, which be described in detail later, via the connector portions 202 and 102. The optical characteristics transmission unit 233 transmits optical characteristics data, which will be described in detail later, to the camera body 100 via the connector portions 202 and 102.

As has been described in reference to FIG. 1, the quick return mirror 108 is disposed in the camera body 100. On the back side of the quick return mirror 108, a sub-mirror 113 is disposed perpendicular to the quick return mirror 108. In a photographing state, the quick return mirror 108 and the sub-mirror 113 move out of the photographic optical path, as indicated by the dotted lines in FIG. 2. In this state, subject light having been transmitted through the photographic optical system 210 is allowed to enter the image sensor 104 via a shutter 115 and a filter 116 disposed within the camera body 100. The filter 116 is a combination optical filter configured by combining an optical low pass filter with an infrared filter. The shutter 115 is used to control exposure conditions at the image sensor 104.

When the camera is not engaged in photographing operation, part of the subject light is guided to the photographer's eye via the quick return mirror 108, a pentaprism 111 and an eyepiece lens 112. The photographer is thus able to view the subject image. In addition, part of the remaining subject light is transmitted through the quick return mirror 108 and enters the sub-mirror 113. At the sub-mirror 113, the subject light is reflected and is directed toward a focus detection device 117. The focus detection device 117 detects the focusing condition at the photographic optical system 210, i.e., the defocus amount, through a method of the known art.

A body-side control circuit 103 that controls the various units located at the camera body 100 is disposed inside the camera body 100. The body-side control circuit 103 is configured with a microcomputer, a RAM, their peripheral circuits and the like (none shown). The body-side control circuit 103, which is connected to a body ROM 118 and the connector portion 102, is able to exchange electrical signals with these units.

The body-side control circuit 103 includes an identification data reception unit 131, a representation format selection unit 132, an optical characteristics request transmission unit 133, an optical characteristics reception unit 134 and an image correction unit 135. These units are functional units, the functions of which are realized through software as the body-side control circuit 103 executes a specific control program. The identification data reception unit 131 receives the identification data originating from the interchangeable lens 200, which will be described in detail later, via the connector portions 102 and 202. The representation format selection unit 132 selects a specific representation format among a plurality of representation formats (to be described in detail later). The optical characteristics request transmission unit 133 transmits the optical characteristics request signal, which will be described later, to the interchangeable lens 200 via the connector portions 102 and 202. The optical characteristics reception unit 134 receives the optical characteristics data originating from the interchangeable lens 200, to be described later, via the connector portions 102 and 202. The image correction unit 135 executes image correction processing of the known art for an image captured via the image sensor 104 based upon the optical characteristics data received at the optical characteristics reception unit 134.

(Description of Spectral Transmittance Characteristics)

The interchangeable lens 200 in the embodiment holds information pertaining to the spectral transmittance characteristics, i.e., a type of optical characteristics, of the photographic optical system 210 as data stored in the lens ROM 212. In other words, spectral transmittance data are stored in the lens ROM 212 as the optical characteristics data. The following is a description of the spectral transmittance.

Figure 3:
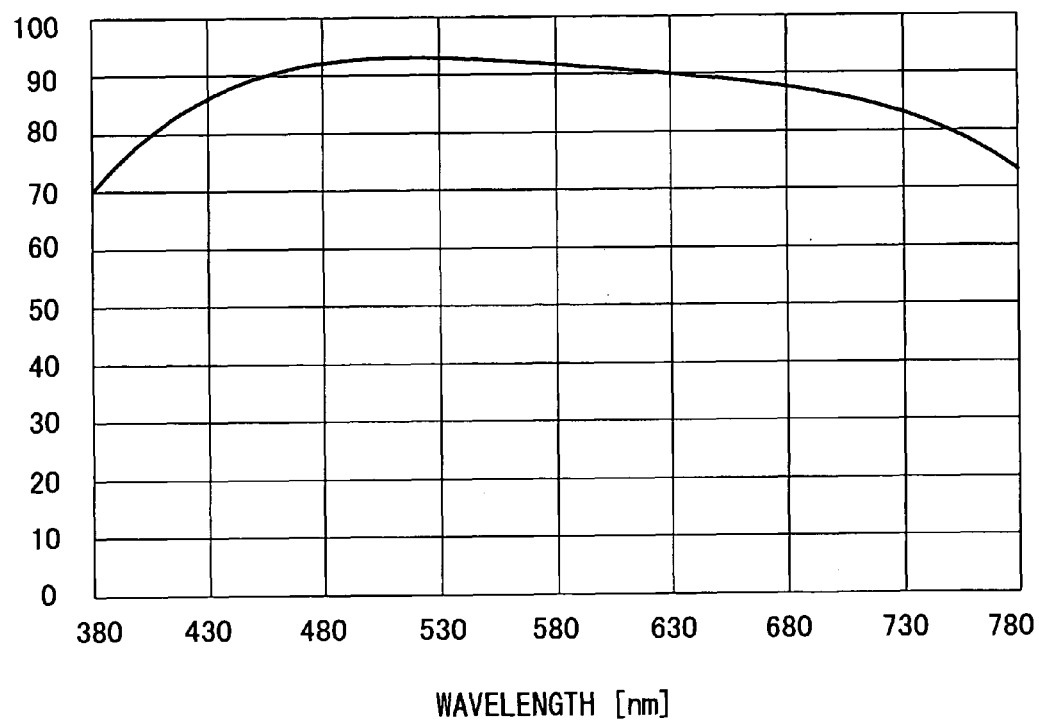

FIG. 3 is a graph of the spectral transmittance characteristics of the photographic optical system 210. In the graph presented in FIG. 3, the wavelengths of light fluxes entering the photographic optical system 210 are indicated along the horizontal axis and the transmittances of the light fluxes with such wavelengths, manifesting in the vicinity of the optical axes thereof, are indicated along the vertical axis. The image correction unit 135 in the camera body 100 corrects the white balance based upon the spectral transmittance characteristics shown in FIG. 3.

(Description of Representation Formats for the Spectral Transmittance Characteristics)

The spectral transmittance characteristics shown in FIG. 3 may be expressed (coded) as data adopting various representation formats (coding methods). It is to be noted, however, that the optimal representation format for the particular interchangeable lens 200 may change as technologies advance over time.

For instance, the storage capacity of the lens ROM 212 may be increased through higher integration or the like and, in such a case, a representation format with a higher resolution can be adopted. In addition, faster communication between the lens-side control circuit 203 and the body-side control circuit 103 will make it possible to handle a representation format necessitating greater data size. Furthermore, an improvement in the processing speed at the body-side control circuit 103 will allow the use of a more complex representation format.

The interchangeable lens 200 and the camera body 100 in the embodiment are each structured so as to be able to handle a plurality of representation formats. In more specific terms, the interchangeable lens 200 and the camera body 100 are able to handle representation formats that become available at different time points and can, therefore, take advantage of representation formats that become available later and represent an improvement over earlier formats. In the following description, four different representation formats, i.e., first through fourth generation representation formats, constitute the plurality of representation formats.

Figure 4:
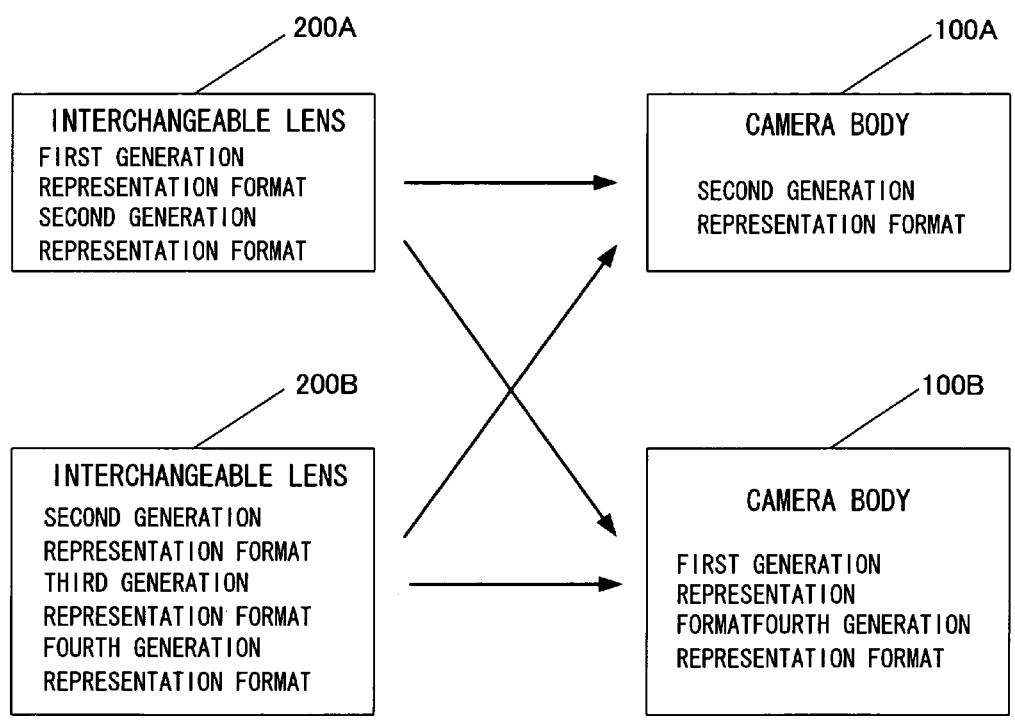

FIG. 4 presents examples of combinations of representation formats. An interchangeable lens 200A in FIG. 4 supports the first generation representation format and the second generation representation format. More specifically, spectral transmittance characteristics data expressed in the first generation representation format (hereafter referred to as first generation spectral transmittance data) and spectral transmittance characteristics data expressed in the second generation representation format (hereafter referred to as second generation spectral transmittance data) are stored in the lens ROM 212 at the interchangeable lens 200A.

An interchangeable lens 200B in the figure supports the second through fourth generation representation formats. In other words, second generation spectral transmittance data, spectral transmittance characteristics data expressed in the third generation representation format (hereafter referred to as third generation spectral transmittance data) and spectral transmittance characteristics data expressed in the fourth generation representation format (hereafter referred to as fourth generation spectral transmittance data) are stored in the lens ROM 212 at the interchangeable lens 200B.

In the lens ROM 212 at each interchangeable lens, lens-side identification data indicating the various generation representation formats corresponding to the individual generation spectral transmittance data held therein are stored, in addition to the spectral transmittance data. Namely, lens-side identification data indicating the first generation representation format and the second generation representation format are stored in the lens ROM 212 at the interchangeable lens 200A. In addition, lens-side identification data indicating the second generation representation format, the third generation representation format and the fourth generation representation format are stored in the lens ROM 212 at the interchangeable lens 200B.

A camera body 100A in the FIG. 4 only supports the second generation representation format. More specifically, body-side identification data indicating the second generation representation format are stored in the body ROM 118 at the camera body 100A. In addition, the image correction unit 135 at the camera body 100A is structured so as to be able to execute image correction processing by using the second generation spectral transmittance data.

The camera body 100B supports the first generation representation format and the fourth generation representation format. Namely, body-side identification data indicating the first generation representation format and the fourth generation representation format are stored in the body ROM 118 at the camera body 100B. In addition, the image correction unit 135 at the camera body 100B is structured so as to be able to execute image correction processing by using the second generation spectral transmittance data or the fourth generation spectral transmittance data.

As the interchangeable lens 200A is mounted at the camera body 100A, the camera body 100A selects the latest representation format among the representation formats supported both at the camera body 100A and at the interchangeable lens 200A. Namely, it selects the second generation representation format. It then receives the second generation spectral transmittance data from the interchangeable lens 200A and executes image correction processing by using the data thus received.

Likewise, as the interchangeable lens 200A is mounted at the camera body 100B, the first generation representation format is selected at the camera body 100B. In addition, as the interchangeable lens 200B is mounted at the camera body 100B, the fourth generation representation format is selected at the camera body 100B.

As described above, the interchangeable lens 200 achieved in the embodiment holds a plurality of sets of spectral transmittance data each expressing the spectral transmittance characteristics in a specific representation format among a plurality of representation formats. In addition, lens-side identification data indicating the plurality of representation formats are stored in the lens ROM 212. Body-side identification data indicating each representation format that can be handled at the camera body 100 are stored in the body ROM 118. The plurality of representation formats are ranked in correspondence to the chronological order in which they became available and the representation format selection unit 132 selects the latest representation format among the representation formats indicated by both the lens-side identification data and the body-side identification data.

(Detailed Description of Various Representation Formats)

Figure 5:
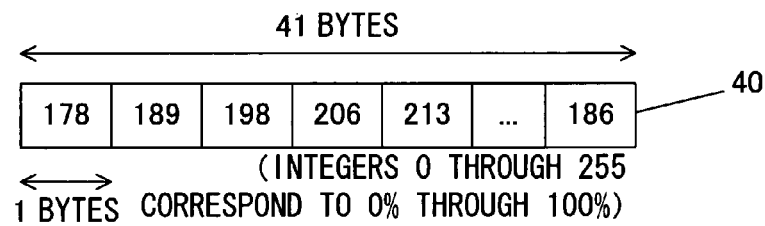
Figure 5:
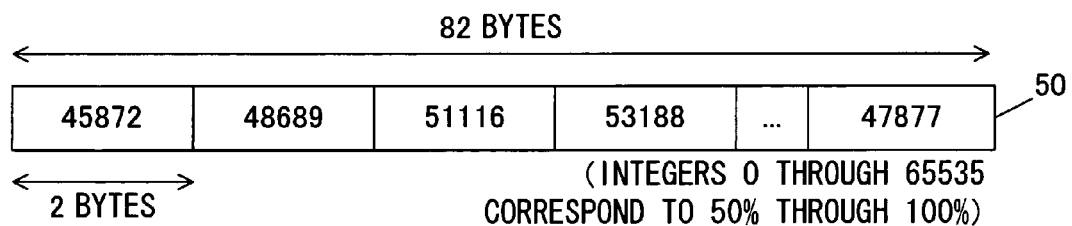

FIG. 5 presents diagrams illustrating the first generation representation format and the second generation representation format used to express the spectral transmittance characteristics. As FIG. 5(a) indicates, the spectral transmittance characteristics are expressed as data in 10 nm increments over a wavelength range of 380 nm through 780 nm in the first generation and second generation representation formats. In addition, each individual set of data is one-byte data represented by an integer with no sign appended thereto. Namely, a given set of data is represented by an integer taking a value falling within a range of 0 through 255. Data represented by 0 indicate a transmittance of 0%, whereas data represented by 255 indicates a transmittance of 100%.

FIG. 5(b) shows spectral transmittance data 40 expressed in the first generation representation format. The first one-byte data in the spectral transmittance data 40 indicate the transmittance at the 380 nm wavelength, the next one-byte data in the spectral transmittance data 40 indicate the transmittance at the 390 nm wavelength, and so forth. For instance, the first one-byte data indicate a numerical value "178", which corresponds to "70.00%" indicated in FIG. 5(a).

While the data size of each set of data in the first generation representation format is one byte, sets of data in the second generation representation format each assume a larger data size of two bytes. Namely, each individual set of data is two-byte data represented by an integer with no sign appended thereto and a given set of data are represented by a value taking an integer falling within a range of 0 through 65535. Data represented by 0 indicate a transmittance of 0%, whereas data represented by 65535 indicates a transmittance of 100%.

FIG. 5(c) shows spectral transmittance data 50 expressed in the second generation representation format. The overall data size of the spectral transmittance data 50 is 82 bytes, showing an increase over the 41-byte data size of the first generation spectral transmittance data, and the resolution of the individual sets of data is improved by a factor of 256. For instance, the first two-byte data indicate a numerical value "45872", which corresponds to "70.00%" indicated in FIG. 5(a).

Figure 6:
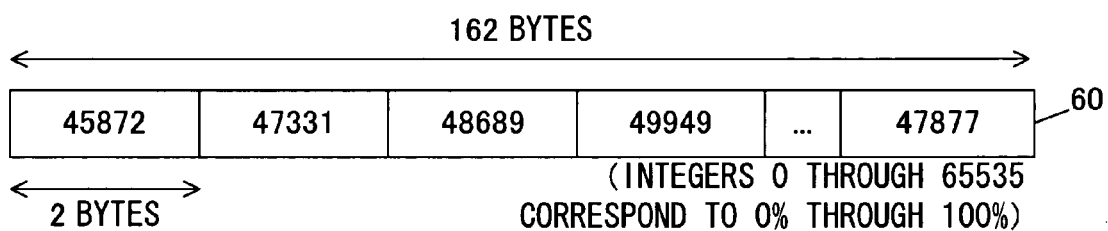
Figure 6:
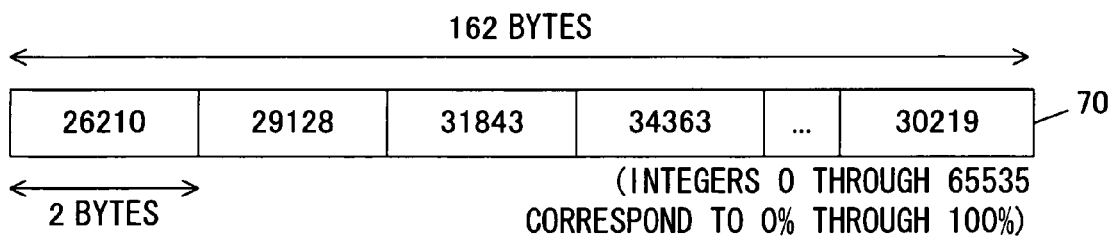

FIG. 6 presents diagrams illustrating the third generation representation format and the fourth generation representation format used to express the spectral transmittance characteristics. As FIG. 6(a) indicates, the spectral transmittance characteristics are expressed as data in 5 nm increments in the third generation and fourth generation representation formats. Namely, the spectral transmittance characteristics data are presented with finer wavelength increments compared to the spectral transmittance characteristics data expressed in the first generation and second generation representation formats shown in FIG. 5(a). It is to be noted that each set of data expressed in the third generation representation format assumes a data size equal to that of the second generation spectral transmittance characteristics data. In other words, each set of data is two-byte data represented by an integer with no sign appended thereto.

FIG. 6(b) shows spectral transmittance data 60 expressed in the third generation representation format. The spectral transmittance data 60, made up with a greater number of sets of data, assumes a greater overall data size of 162 bytes, showing an increase over the 82-byte data size of the second generation spectral transmittance data. Namely, the resolution of the spectral transmittance data 60 achieved along the wavelength direction is twice that of the spectral transmittance data 50, expressed in the second generation representation format.

The following description will be given by assuming that the spectral transmittance of any interchangeable lens manufactured after the third generation representation format became available never falls under 50% over the 380 nm through 780 nm wavelength range. Under such circumstances, the spectral transmittance data do not need to be structured to as to be able to indicate transmittances under 50%. Accordingly, the newer representation format, i.e., the fourth generation representation format improves the transmittance resolution by narrowing the range of transmittances that are to be indicated by the spectral transmittance data.

FIG. 6(c) shows spectral transmittance data 70 expressed in the fourth generation representation format. In the earlier generation representation formats, integers in the range of 0 through 65535 with no sign appended thereto correspond to transmittances from 0% through 100%. In the fourth generation representation format, integers in the range of 0 through 65535 with no sign appended thereto correspond to transmittances in the range of 50% through 100%.

It is to be noted that this modification in the representation format does not alter the data size, as indicated in FIG. 6(c). Namely, the overall data size of the fourth generation spectral transmittance data is 162 bytes, which is the same as the data size of the spectral transmittance data in the third generation representation format shown in FIG. 6(b). However, the range of values that need to be indicated by the data is substantially halved to 50% from 100%. This means that the transmittance resolution of the spectral transmittance data 70 is improved by a factor of approximately 2 over that of the spectral transmittance data 60 expressed in the third generation representation format.

(Description of the Operation at the Camera Body 100)

FIG. 7 presents a flowchart of processing executed by the body-side control circuit 103. It is to be noted that the processing will be described in reference to FIG. 7 by assuming that the interchangeable lens 200 has already been mounted. In step S100, the body-side control circuit 103 turns on power to the camera body 100 in response to an operation of a power switch (not shown).

In step S110, the body-side control circuit 103 issues a request to the interchangeable lens 200 for identification data. In more specific terms, the body-side control circuit 103 transmits, via the connector portions 102 and 202, a signal to the lens-side control circuit 203 requesting the lens-side identification data. In response to this signal, the identification data transmission unit 231 transmits the lens-side identification data to the camera body 100. In step S120, the identification data reception unit 131 receives the lens-side identification data via the connector portions 102 and 202.

In step S130, the representation format selection unit 132 compares the lens-side identification data received in step S120 with the body-side identification data stored in the body ROM 118. In step S140, the representation format selection unit 132 makes a decision based upon the results of the comparison made in step S130 as to whether or not the two types of identification data indicate matching representation formats, i.e., whether or not there is any common representation format included in both the lens-side identification data and the body-side identification data. If there is no such common representation format, a negative decision is made in step S140, and the operation proceeds to step S200.

In step S200, the image correction unit 135 selects an "invalid" setting for image correction processing to be executed based upon spectral transmittance data. Namely, since there are no spectral transmittance data that can be used, no image correction processing will be executed based upon spectral transmittance data.

If, on the other hand, an affirmative decision is made in step S140, the operation proceeds to step S300. In step S300, the representation format selection unit 132 selects the latest generation representation format among the representation formats indicated in both the lens-side identification data and the body-side identification data. For instance, if the two types of identification data both include the third generation representation format and the fourth generation representation format, the fourth generation representation format, i.e., the newer representation format, will be selected.

In step S310, the optical characteristics request transmission unit 133 issues a request to the interchangeable lens 200 for the spectral transmittance data expressed in the representation format selected in step S300. In more specific terms, the optical characteristics request transmission unit 133 transmits a signal to the lens-side control circuit 203 via the connector portions 102 and 202, requesting the spectral transmittance data expressed in the selected representation format. As this signal is received by the optical characteristics request reception unit 232, the optical characteristics transmission unit 233 reads out the spectral transmittance data in the corresponding representation format from the lens ROM 212 and transmits the spectral transmittance data thus read out to the camera body 100.

In step S320, the optical characteristics reception unit 134 receives the spectral transmittance data expressed in the representation format selected in step S300 via the connector portions 102 and 202. Subsequently, each time a photographing operation is executed, the image correction unit 135 executes image correction processing of the known art based upon the spectral transmittance data received in step S320.

The following advantages are achieved with the camera in the first embodiment described above.

(1) The representation format selection unit 132 selects a specific representation format that is indicated both in the lens-side identification data originating from the interchangeable lens 200 and received at the identification data reception unit 131 and in the body-side identification data stored in the body ROM 118. The optical characteristics request transmission unit 133 issues a request to the interchangeable lens 200 for the optical characteristics data (spectral transmittance data) corresponding to the selected representation format and the optical characteristics reception unit 134 receives the optical characteristics data. Through these measures, the optical characteristics data representation format can be changed with ease while maintaining compatibility.

(2) The image correction unit 135 executes a specific type of image correction processing based upon the optical characteristics data (spectral transmittance data) received at the optical characteristics reception unit 134. As a result, the optimal image correction processing can be executed for photographic images at all times.

(3) If there is a plurality of representation formats indicated in both the lens-side identification data and the body-side identification data, the representation format selection unit 132 selects the latest representation format based upon rankings set according to the chronological order in which the individual representation formats became available. Through these measures, it is ensured that the newest possible representation format is selected so as to enable the image correction unit 135 to execute the optimal image correction processing.

The following variations are also within the scope of the present invention and any one of the variations or a plurality of variations may be adopted in combination with the embodiment described above.

(Variation 1)

In the embodiment described above, the data indicate the spectral transmittance characteristics which are a type of optical characteristics of the photographic optical system 210. However, it will be obvious that the present invention may be adopted in conjunction with data indicating characteristics other than the spectral transmittance characteristics. For instance, the present invention may be adopted for purposes of correcting coloration attributable to the lens or any coating applied to the lens. The present invention may be further adopted for purposes of correction of chromatic aberration, typical examples of which include lateral chromatic aberration and longitudinal chromatic aberration, correction of distortion aberration, peripheral light quantity correction, compensation for lowered definition attributable to a decrease in the lens MTF (modulation transfer function) and the like.

(Variation 2)

The flow of processing described in reference to the embodiment starts up as power to the camera body 100 is turned on with the interchangeable lens 200 already mounted at the camera body 100. However, the timing with which the identification data are transmitted/received and the lens-side identification data are compared with the body-side identification data is not limited to this example. For instance, the processing described above may be executed upon detecting that the interchangeable lens 200 has been mounted.

(Variation 3)

In the embodiment described above, all the optical characteristics data are transmitted and received through the initial communication. However, the present invention is not limited to this example and if the volume of data being handled is large, e.g., if the data indicate optical characteristics that change in correspondence to the focal length or the camera-to-subject distance, a specific setting may be selected at the camera body 100 so that only the essential part of the optical characteristics data is transmitted. For instance, if image correction processing is executed only at the time of a photographing operation, specific optical characteristics data that correspond to the conditions at the time of the photographing operation alone may be transmitted to the camera body 100 before or after the photographing operation.

(Variation 4)

In the embodiment described above, the data size changes from one optical characteristics data representation format to another and data are interpreted differently from one optical characteristics data representation format to another. However, the present invention may be adopted in conjunction with a plurality of representation formats differentiated by an aspect other than a size or data interpretation. More specifically, the present invention may be adopted in conjunction with any plurality of representation formats differentiated from one another by an aspect that will necessitate the image correction unit 135 to change the manner with which it handles optical characteristics data received at the optical characteristics reception unit 134.

As long as the features characterizing the present invention remain intact, the present invention is in no way limited to the particulars of the embodiment described above, and any other modes conceivable within the scope of the technical teachings of the present invention are also within the scope of the present invention.

The disclosure of the following priority application is herein incorporated by reference:

Japanese Patent Application No. 2010-154085 filed Jul. 6, 2010

The invention claimed is:

1. A camera body configured to detachably mount an interchangeable lens holding a plurality of sets of optical characteristics data, each of the plurality of sets of optical characteristics data expressing specific optical characteristics in one of a plurality of representation formats, the camera body comprising:

an identification information reception unit that receives lens-side identification information that originates from the interchangeable lens, the lens-side identification information indicating the plurality of representation formats;

an identification information storage unit in which body-side identification information is stored, the body-side identification information indicating each representation format that the camera body recognizes among the plurality of representation formats;

a selection unit that selects a single representation format that is included in both the lens-side identification information and the body-side identification information, among the plurality of representation formats;
a request unit that issues a request to the interchangeable lens for the optical characteristics data corresponding to the selected representation format; and
an optical characteristics reception unit that receives the requested optical characteristics data from the interchangeable lens.

2. The camera body according to claim 1, further comprising:
an image processing unit that executes specific image processing based upon the optical characteristics data received by the optical characteristics reception unit.

3. The camera body according to claim 1, wherein:
the plurality of representation formats are assigned with specific rankings; and
when there are a plurality of representation formats included in both the lens-side identification information and the body-side identification information, the selection unit selects the single representation format based upon the specific rankings.

4. The camera body according to claim 3, wherein:
the specific rankings are determined based upon a chronological order in which the plurality of representation formats became available.

5. The camera body according to claim 1, wherein:
the identification information reception unit receives the lens-side identification information at least either as the interchangeable lens is mounted or as power to the camera body is turned on; and
the optical characteristics reception unit repeatedly receives the requested optical characteristics data.

6. The camera body according to claim 1, wherein the detachably mounted interchangeable lens comprises:
an identification information transmission unit that transmits the lens-side identification information to the camera body;
an optical characteristics storage unit in which the plurality of sets of optical characteristics data are stored; and
an optical characteristics transmission unit that transmits the optical characteristics data requested by the camera body, among the plurality of sets of optical characteristics data, to the camera body.

* * * * *